(12) United States Patent
Shiramatsu et al.

(10) Patent No.: US 7,777,990 B2
(45) Date of Patent: Aug. 17, 2010

(54) MAGNETIC DISK UNIT AND MAGNETIC HEAD SLIDER

(75) Inventors: Toshiya Shiramatsu, Ibaraki (JP); Masayuki Kurita, Ibaraki (JP); Mikio Tokuyama, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1102 days.

(21) Appl. No.: 11/449,059

(22) Filed: Jun. 7, 2006

(65) Prior Publication Data

US 2006/0279878 A1    Dec. 14, 2006

(30) Foreign Application Priority Data

Jun. 8, 2005    (JP)    ............................. 2005-167758

(51) Int. Cl.
*G11B 5/60* (2006.01)
(52) U.S. Cl. ..................................................... 360/128
(58) Field of Classification Search ........................ None
See application file for complete search history.

(56) References Cited

U.S. PATENT DOCUMENTS

| | | | |
|---|---|---|---|
| 6,038,101 A * | 3/2000 | Yoda et al. ............... | 360/235.2 |
| 6,437,943 B1 * | 8/2002 | Yokote et al. ............ | 360/235.3 |
| 6,665,136 B2 * | 12/2003 | Clinton et al. ............ | 360/55 |
| 6,731,461 B2 * | 5/2004 | Yamada et al. .......... | 360/125.72 |
| 6,760,191 B1 * | 7/2004 | Yan et al. ................. | 360/128 |
| 6,859,343 B1 * | 2/2005 | Alfoqaha et al. ........ | 360/125.72 |
| 7,170,713 B2 * | 1/2007 | Gider et al. .............. | 360/128 |
| 7,212,367 B2 * | 5/2007 | Clinton et al. ........... | 360/55 |
| 2002/0067571 A1 | 6/2002 | Yoshida et al. | |
| 2003/0021065 A1 * | 1/2003 | Yamada et al. .......... | 360/126 |

* cited by examiner

*Primary Examiner*—Mark Blouin
(74) *Attorney, Agent, or Firm*—Townsend and Townsend and Crew; Rambod Nader

(57) ABSTRACT

In a magnetic disk unit, the flying height margin of a magnetic recording element part during recording is reduced, whereby improvement in recording density and increase in capacity or decrease in size of the unit is realized. In one embodiment, a magnetic disk unit has a magnetic disk arranged in a freely rotational manner and a magnetic head slider disposed to face a surface of the magnetic disk, and generates air flow between the magnetic disk and the magnetic head slider for flying, and records data using a magnetic recording element. The magnetic head slider has a slider substrate part and a thin-film head part formed on the slider substrate part using a thin-film process. The thin-film head part has an insulating member, a magnetic recording element provided in the insulating member, and a heat radiation member for radiating heat generated by the magnetic recording element from lateral regions of the magnetic recording element to the slider substrate part.

19 Claims, 12 Drawing Sheets

(A) WITHOUT HEAT-RADIATION/
EXPANSION MEMBER (B) WITH HEAT-RADIATION/
EXPANSION MEMBER

MAGNETIC DISK UNIT AND MAGNETIC HEAD SLIDER

CROSS-REFERENCES TO RELATED APPLICATIONS

This application claims priority from Japanese Patent Application No. JP2005-167758, filed Jun. 8, 2005, the entire disclosure of which is incorporated herein by reference.

BACKGROUND OF THE INVENTION

The present invention relates to a magnetic disk unit and a magnetic head slider and, in particular, to a magnetic disk unit that flies the magnetic head slider above a magnetic disk for recording data and for the magnetic head slider for use in the unit.

A magnetic disk unit has a rotational magnetic disk, and a magnetic head slider which is mounted with a magnetic recording element and supported by a magnetic head support mechanism and positioned in a radial direction of the magnetic disk, and the unit is configured such that the magnetic head slider travels on the magnetic disk to record data into the magnetic disk. The magnetic head slider has an air lubrication bearing function and flies above a surface of the magnetic disk by a wedge film effect of air, so that the magnetic disk does not make solid contact directly with the magnetic head slider.

A magnetic head slider for use in a conventional magnetic disk unit includes a slider shown in JP-A-2002-25006 (patent literature 1), which is devised for preventing projection of the slider in a flying surface direction and breaking of a coil conductor itself due to heat generated by the coil conductor. The magnetic head slider has an inductive type, writing head element (magnetic recording element) including an upper core layer that is magnetically coupled to an upper magnetic pole at a front end, a lower core layer that is magnetically coupled to a lower magnetic pole at the front end, a coil conductor inserted between the upper core layer and the lower core layer, and a coil insulating layer formed with sandwiching the coil conductor. In the magnetic head slider shown in FIG. 7 of patent literature 1, a thermal diffusion member having a good heat transfer property is formed on the coil insulating layers in the outer rear and both lateral regions outside of the upper core layer, and a protective layer that is an insulating member is formed on the upper core layer and the thermal diffusion member.

Recently, in the magnetic disk unit, improvement in recording density and thus increase in capacity or decrease in size of the unit have been strongly desired. To realize these objectives, a distance between the magnetic head slider and the magnetic disk (or flying height of the slider) is effectively reduced to increase a line recording density of the magnetic disk.

Conventionally, in the design of the flying height of the slider, lowering of flying height due to variation in processing, difference in atmospheric pressure in use environment, and difference in temperature in use environment has been taken into account, and a flying height margin has been given such that the magnetic head slider does not contact the magnetic disk even in the worst condition.

There are two types of factors for the lowering of flying height due to the temperature difference in use environment. One of them is lowering of flying height due to local thermal-projection in a nanometer order caused by heated and thermally expanded neighborhood of a magnetic recording element of a magnetic head by generated heat. The heat is the sum of heat (iron loss) generated by eddy-current loss generated in a magnetic pole by electromagnetic induction when recording current flows through the coil conductor and heat (copper loss) generated in the coil conductor due to the recording current. Another is lowering of flying height due to local thermal-projection in a nanometer order caused by ambient-temperature rise because of the difference in linear expansion coefficients between a metal material of magnetic shield near the magnetic recording element or a magnetic pole and a ceramic insulating material of other portions.

Thus, if a slider that can keep a flying height responsive to the use environment can be realized, the flying height margin can be reduced, and while the magnetic head slider is prevented from contacting the magnetic disk, the flying height of the magnetic head slider can be significantly reduced.

Although heat generated by a writing head element is radiated into air from a surface of the protective layer through the thermal diffusion member and the protective layer in patent literature 1, since the heat radiation efficiency from the surface of the protective layer as the insulating member is low, and the surface area of the protective layer is small, the heat generated by the writing head element is hard to be radiated outside through the thermal diffusion member. Therefore, a problem that the thermal projection of a magnetic recording element part cannot be sufficiently suppressed, and the flying height margin cannot be sufficiently reduced, has remained.

When the thermal diffusion film is provided near the magnetic recording element as in patent literature 1, there has been a problem that when the ambient temperature rises, the thermal diffusion film also expands, whereby the thermal projection of the flying surface by the magnetic recording element is assisted.

BRIEF SUMMARY OF THE INVENTION

A feature of the invention is to provide a magnetic disk unit and a magnetic head slider in which the flying height margin of the magnetic recording element part is reduced in recording, whereby improvement in recording density and increase in capacity and decrease in size of the unit can be realized.

Another feature of the invention is to provide a magnetic disk unit and a magnetic head slider in which the flying height margin of the magnetic recording element part is reduced in both periods of recording and ambient-temperature rise, and improvement in recording density and increase in capacity and decrease in size of the unit can be realized.

In a first aspect of the invention, a magnetic disk unit comprises a magnetic disk arranged in a freely rotational manner and a magnetic head slider disposed to face a surface of the magnetic disk. Air flow is generated between the magnetic disk and the magnetic head slider to fly the magnetic head slider, and data is recorded into the magnetic disk using a magnetic recording element provided in the magnetic head slider, wherein the magnetic head slider has a slider substrate part and a thin-film head part formed on the slider substrate part using a thin film process. The thin-film head part comprises an insulating member, the magnetic recording element provided in the insulating member, and a heat radiation member for radiating heat generated by the magnetic recording element from lateral regions of the magnetic recording element to the slider substrate part.

Specific configuration examples in such a first aspect of the invention are as follows:

(1) The slider substrate part and the heat radiation member are formed from a material having a higher heat conductivity than that of the insulating member;

(2) in the above (1), the slider substrate part is formed from a mixed sintered-body of alumina and titanium carbide, the insulating member is formed from alumina, and the heat radiation member is formed from a metal material having a higher heat conductivity than that of the insulating member;

(3) the thin-film head part has a magnetic reproduction element arranged parallel at a side of the slider substrate part of the magnetic recording element, and the heat radiation member is formed to have surfaces sandwiching the magnetic recording element and the magnetic reproduction element from both sides;

(4) in the above (3), the heat radiation member is formed from two edges opposed to both sides of the magnetic recording element and the magnetic reproduction element, and one edge opposed to a side opposite to a side of the slider substrate part of the magnetic recording element;

(5) in the above (4), each thickness of the two edges opposed to both the sides of the magnetic recording element and the magnetic reproduction element is formed larger than a thickness of the one edge opposite to the side of the slider substrate part of the magnetic recording element;

(6) the heat radiation member has a flat face part which is opposed to a surface of the slider substrate part and thermally coupled to the surface;

(7) in the above (6), the flat face part which is opposed to the surface of the slider substrate part and thermally coupled to the surface has an area of about 20 $\mu m^2$ or more;

(8) in the above (6), the flat face part which is thermally coupled to the surface of the slider substrate part is directly contacted with the surface of the slider substrate part;

(9) in the above (6), the flat face part which is thermally coupled to the surface of the slider substrate part has a distance of about 20 $\mu m$ or less to the surface of the slider substrate part with;

(10) an air bearing surface forming a flying surface of the magnetic head slider comprising a first surface which approaches the magnetic disk more closely during recording and is provided with the magnetic recording element, and two or more surfaces having predetermined, different depths from the first surface, and the heat radiation member has a position projected on the air bearing surface which is in a surface having a depth other than that of the first surface;

(11) an air bearing surface forming a flying surface of the magnetic head slider comprises a first surface which approaches the magnetic disk more closely during recording and has been provided with the magnetic recording element, a second surface having a depth of about 5 nm to 50 nm from the first surface, a third surface having a predetermined depth from the second surface, and a fourth surface located deeper than the third surface, and the heat radiation member has a position projected on the air bearing surface which is in the second surface;

(12) in the above (11), the heat radiation member is formed from a material having a larger linear expansion coefficient than that of the insulating member; and

(13) in the above (10) or (11), the first surface is provided at a position of laterally central portion, and the heat radiation member is formed from two edges opposed to both sides of the magnetic recording element, and one edge opposed to a side opposite to a side of the slider substrate part of the magnetic recording element, and a position projected on the air bearing surface is formed in a shape of fringing the first surface.

In a second aspect of the invention, a magnetic head slider has a slider substrate part and a thin-film head part formed on the slider substrate part using a thin film process, a flying surface that generates air flow between the magnetic disk and the surface for flying, and a magnetic recording element for recording data into the magnetic disk, wherein the thin-film head part comprises an insulating member, the magnetic recording element provided in the insulating member, and a heat radiation member for radiating heat generated by the magnetic recording element from lateral regions of the magnetic recording element to the slider substrate part.

In a third aspect of the invention, a magnetic disk unit comprises a magnetic disk arranged in a freely rotational manner and a magnetic head slider disposed to face a surface of the magnetic disk, generates air flow between the magnetic disk and the magnetic head slider to fly the magnetic head slider, and records data into the magnetic disk and reproduces data from the magnetic disk using a magnetic recording/reproduction element comprising a magnetic recording element and a magnetic reproduction element provided in the magnetic head slider; wherein the magnetic head slider has a slider substrate part and a thin-film head part formed on the slider substrate part using a thin film process, and the thin-film head part comprises an insulating member, the magnetic recording/reproduction element provided in the insulating member, and an expansion member having a larger linear expansion coefficient than that of the insulating member provided near the magnetic recording/reproduction element, and an air bearing surface forming a flying surface of the magnetic head slider comprises a first surface which approaches the magnetic disk more closely during recording and is provided with the magnetic recording element and has a width smaller than that of a second surface, the second surface having a depth of about 5 nm to 50 nm from the first surface, a third surface having a predetermined depth from the second surface, and a fourth surface located deeper than the third surface, and the expansion member is provided such that a position projected on the air bearing surface is in the second surface, and flying height is corrected by locally projecting the second surface with ambient-temperature rise.

In a fourth aspect of the invention, a magnetic head slider has a slider substrate part and a thin-film head part formed on the slider substrate part using a thin film process, a flying surface that generates air flow between the magnetic disk and the surface for flying, and a magnetic recording element for recording data into the magnetic disk and a magnetic reproduction element for reproducing data from the magnetic disk; wherein the thin-film head part comprises an insulating member, the magnetic recording element or the magnetic reproduction element provided in the insulating member, and an expansion member, which has a larger linear expansion coefficient than that of the insulating member, near the magnetic recording element or the magnetic reproduction element, and an air bearing surface forming a flying surface of the magnetic head slider comprises a first surface which approaches the magnetic disk more closely during recording and is provided with the magnetic recording element and has a width smaller than that of a second surface, the second surface having a depth of about 5 nm to 50 nm from the first surface, a third surface having a predetermined depth from the second surface, and a fourth surface located deeper than the third surface, and the expansion member is provided such that a position projected on the air bearing surface is in the second surface, and flying height is corrected by locally projecting the second surface with ambient-temperature rise.

According to the invention, a magnetic disk unit and a magnetic head slider in which flying height margin of the magnetic recording element part is reduced during recording, whereby improvement in recording density and increase in capacity and decrease in size of the unit can be realized, can be provided.

In addition, according to the invention, the magnetic disk unit and the magnetic head slider in which the flying height margin of the magnetic recording element part is reduced in both periods of recording and ambient-temperature rise, whereby improvement in recording density and increase in capacity and decrease in size of the unit can be realized, can be provided.

BRIEF DESCRIPTION OF THE DRAWINGS

FIG. 1 is a view illustrating the mechanism for correcting the lowering of flying height due to ambient-temperature rise in the second embodiment.

DETAILED DESCRIPTION OF THE INVENTION

Hereinafter, several embodiments of the invention are described using drawings. Same references in drawings of respective embodiments indicate same or corresponding articles.

First Embodiment

A magnetic disk unit and a magnetic head slider of a first embodiment of the invention are described using FIG. 1 to FIG. 7.

Figure 1:
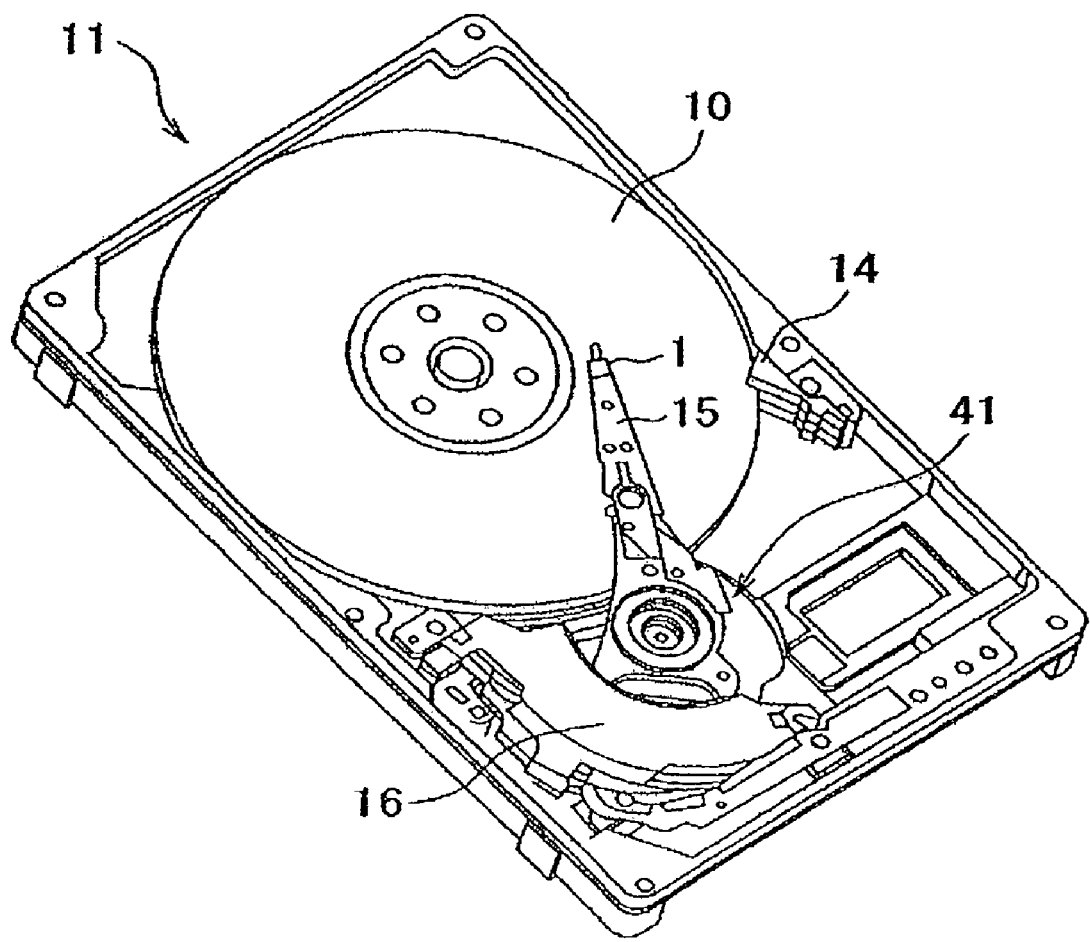
FIG. 1 is a perspective view of a magnetic disk unit of a first embodiment of the invention.

A general configuration of the magnetic disk unit according to the first embodiment is described with reference to FIG. 1. FIG. 1 is a perspective view of the magnetic disk unit of the first embodiment of the invention.

A magnetic disk unit 11, which is used as a hard disk unit mounted in a computer apparatus and the like, comprises a magnetic disk 10 arranged in a freely rotational manner, a magnetic head slider (hereinafter, abbreviated to slider) 1 arranged to face a surface of the magnetic disk, and a drive 41 for moving the slider 1 in a radial direction of the surface of the magnetic disk 10. The magnetic disk unit 11 is configured to generate air flow between the rotating magnetic-disk 10 and the slider 1, and fly the slider 1 from the magnetic disk 10 with a small gap by a wedge effect due to the air flow, so that the magnetic disk 10 does not make solid contact directly with the slider 1. To realize improvement in recording density of the magnetic disk unit 11 and thus increase in capacity and decrease in size of the unit, it is effective that a distance between the slider 1 and the magnetic disk 10, or flying height of the slider, is reduced to improve a line recording density. Recently, the flying height of the slider is reduced to about 10 nm or 10 nm at the most.

The magnetic disk 10 is a disk-like medium into which magnetic data are stored, and equipped on a spindle motor provided in a chassis and rotated at high speed. The magnetic disk 10 comprises a hard substrate such as glass and a magnetic film formed on the hard substrate by thin-film formation means such as vacuum deposition.

The slider 1 is for recording/reproducing data for the magnetic disk 10, equipped on a tip of a flat-spring load beam 15 forming a part of the drive 41, positioned in the radial direction of the magnetic disk 10, and applied with pressing force to a side of the magnetic disk surface. Thus, the slider 1 travels over the magnetic disk 10, reads magnetic data recorded into the magnetic disk 10, and writes data into the magnetic disk. The slider 1 is opposed to the rotating magnetic disk 10, and a rear end face of the slider 1, where the air flow is received, acts as an air outflow end-face. The load beam 15 forms a magnetic-head support mechanism.

The drive 41 comprises the load beam 15 and a voice coil motor 16. The load beam 15 is supported in a rotational manner by the voice coil motor 16. Accordingly, the slider 1 is driven by the voice coil motor 16 via the load beam 15 and thus moved to any radial position on the magnetic disk 10, or seek is performed, so that recording/reproduction is performed on the entire surface of the magnetic disk. While the unit is stopped, or while a recording/reproduction instruction is not given for a certain time, the slider 1 moves to a ramp 14 located outside the magnetic disk 10 and is held away from the surface of the magnetic disk 10. Although a unit having a load/unload mechanism was shown here, the advantage of the invention is similarly obtained even in the magnetic disk unit 11 of a contact start stop type where the slider 1 waits at a particular region on the magnetic disk 10 while the unit is stopped.

Figure 2:
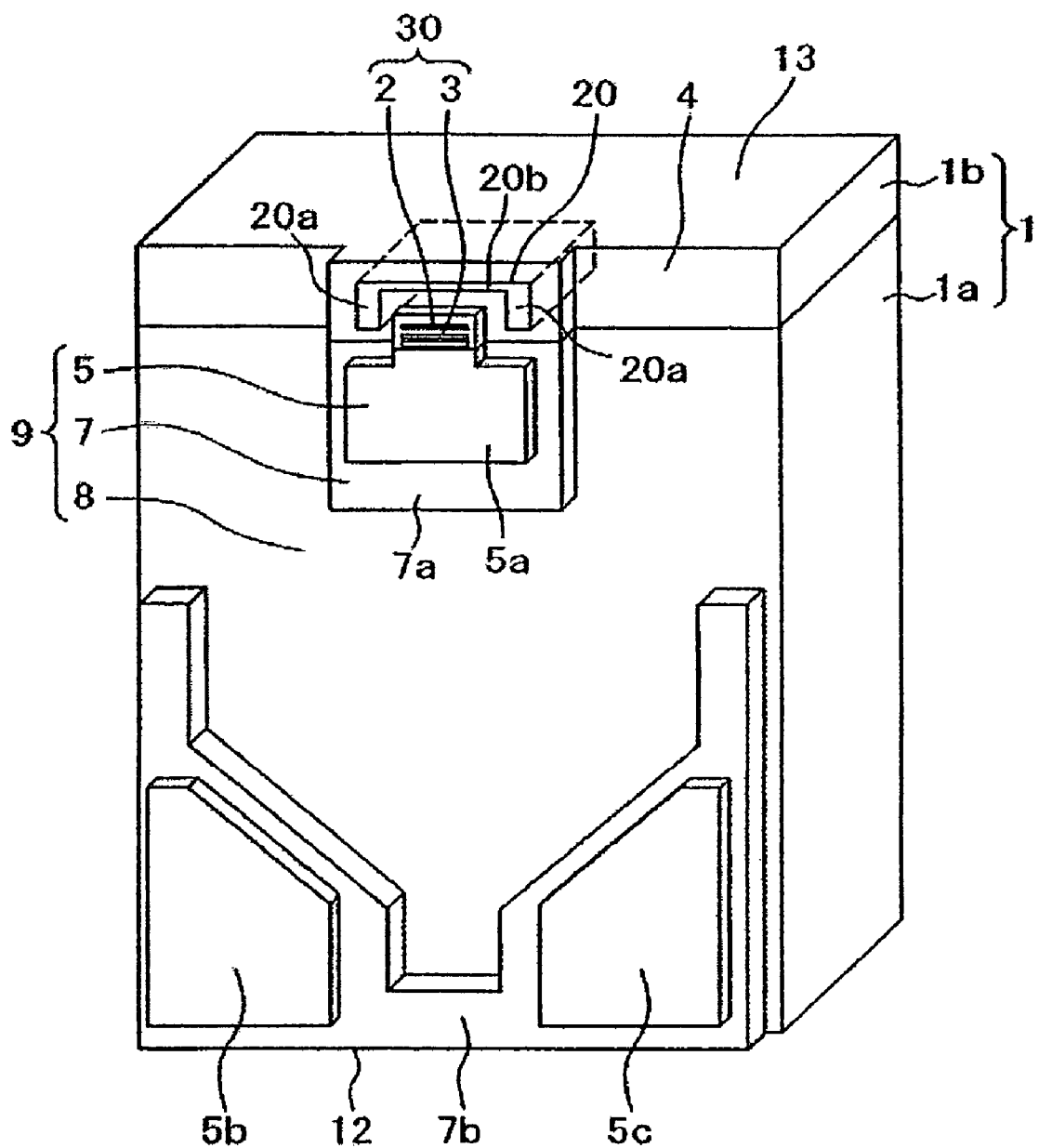
FIG. 2 is a perspective view of a slider for use in the magnetic disk unit of the first embodiment.
Figure 3:
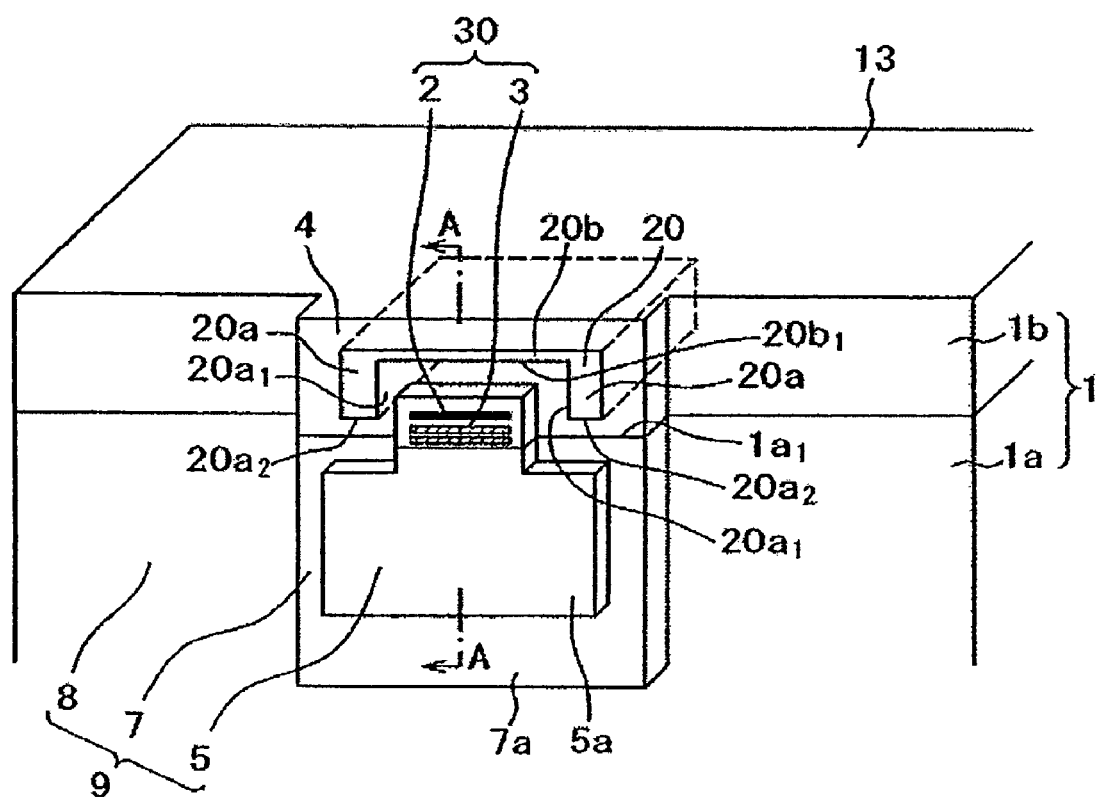
FIG. 3 is a partially enlarged view of the slider of FIG. 2.
Figure 4:
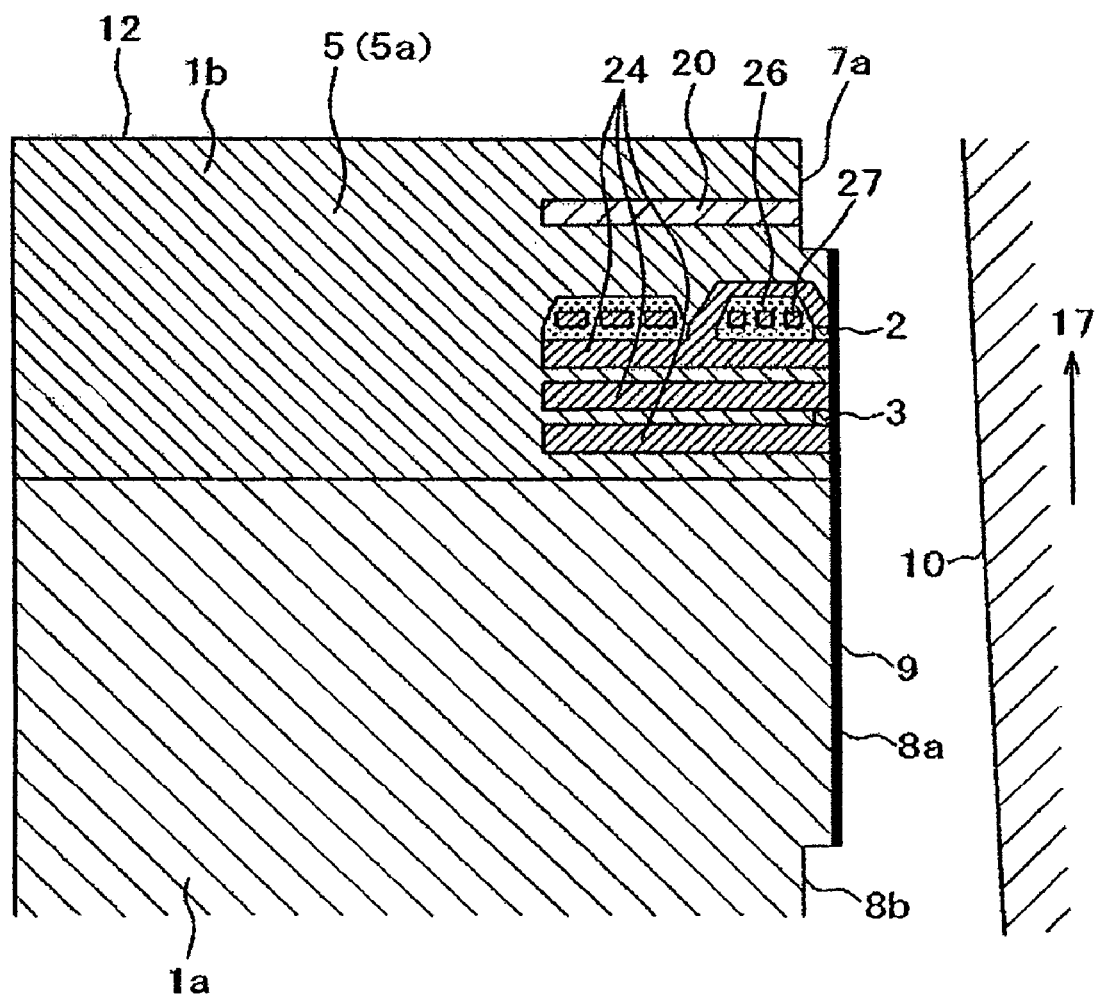
FIG. 4 is an enlarged section view along a line A-A of FIG. 3.

Next, a specific structure of the slider 1 is described with reference to FIG. 2 to FIG. 4. FIG. 2 is a perspective view of the slider 1 for use in the magnetic disk unit 11 of the first embodiment; FIG. 3 is a partially enlarged view of the slider 1 of FIG. 2; and FIG. 4 is an enlarged section view along a line A-A of FIG. 3. In FIG. 4, 17 indicates a rotation direction of the magnetic disk 10.

The slider 1 comprises a slider substrate part 1a and a thin-film head part 1b formed on the slider substrate part 1a using a thin film process. The slider substrate part 1a is formed from a material typically including a mixed sintered body (hereinafter, referred to as AlTiC) of alumina and titanium carbide. The thin-film head part 1b comprises a magnetic recording element 2, a magnetic reproduction element 3, an insulating member 4, a heat radiation member 20 and the like, which are formed on the slider substrate part 1a using a thin-film process. Here, the magnetic recording element 2 is for recording data into the magnetic disk 1, and the magnetic reproduction element 3 is for reproducing data recorded into the magnetic disk 1. The magnetic recording element 2 and the magnetic reproduction element 3 will be collectively called magnetic recording/reproduction element 30.

The slider 1 is, for example, in a shape of an approximately rectangular prism 1.25 mm long, 1.0 mm wide, and 0.3 mm thick, and comprises six surfaces in total of a flying surface 9, an air inflow end-face 12, an air outflow end-face 13, lateral faces at both sides, and a back face. A next generation slider is directed to size reduction for improving positioning accuracy by mass reduction, and for cost reduction and the like.

For example, in a standard called femto-slider, a slider has a size of about 70 percent of the conventional one, which is 0.85 mm long, 0.7 mm wide, and 0.23 mm thick.

A fine step (step bearing) is provided on the flying surface 9 by a process such as ion milling or etching, which acts as an air bearing that faces the magnetic disk 1 and generates air pressure, and thereby supports the load applied to the back face. It was confirmed that the invention was also effective for a slider 0.1 mm thick. The slider thickness of 0.1 mm is a sufficient thickness for making it possible to provide a terminal having a size of an edge of 80 μm on the outflow end face of the slider, when terminals of a suspension and terminals of the slider are formed in adhesion/wiring of the slider and the suspension.

The flying surface 9 is provided with the step as above, and the flying surface 9 is divided into three types of surfaces substantially parallel to each other. The flying surface 9 comprises three types of surfaces of an element placing surface 5 (5a) located most closely to the magnetic disk 10, a shallow trench surface 7 that is a step bearing surface about 100 nm to 200 nm deeper than the element placing surface 5, and a deep trench surface 8 that is about 1 μm deeper than the element placing surface 5. As shown in FIG. 2, the element placing surface 5 is divided into several components 5a, 5b and 5c. The component 5a is placed with a small width compared with the shallow trench surface 7a in a laterally central portion near the air outflow end. Moreover, the component 5a is formed with a small width at an air outflow side, and the magnetic recording element 2 and the magnetic reproduction element 3 are placed in a surface at the small width area. The components 5b, 5c are placed on laterally two sides near the air inflow end. The shallow trench surface 7 is divided into several components 7a, 7b. The component 7a is placed to enclose the element placing surface 5a, and the component 7b is placed to enclose the element placing surfaces 5b, 5c.

When air flow generated by rotation of the magnetic disk 1 enters the element placing surface 5 from the shallow trench surface 7 as the step bearing, it is compressed through a convergent flow channel, and generates positive air pressure. On the other hand, when air flow enters the deep trench surface 8 from the element placing surface 5 and the shallow trench surface 7, negative air pressure is generated by an expanding flow channel. In FIG. 2, depth of the trench is emphatically shown.

The slider 1 is designed in such a posture that flying height at a side of an air inflow end 12 is larger than that at a side of an air outflow end 13. Therefore, a flying surface near the outflow end approaches the magnetic disk 1 more closely. Since the element placing surface 5a projects most against the surrounding shallow trench surface 7 and deep trench surfaces 8 near the outflow end, as long as the slider does not incline in excess of a certain limit in pitch and roll postures, the element placing surface 5a approaches the magnetic disk 1 most closely. The magnetic recording element 2 and the magnetic reproduction element 3 are formed in a portion pertaining to the thin-film head part 1b of the element placing surface 5a. A shape of the flying surface 9 is designed such that load pressed by the load beam is appropriately balanced with positive and negative air pressure generated on the flying surface 9, and a distance from the magnetic recording element 2 and the magnetic reproduction element 3 to the magnetic disk 1 is maintained to be an appropriate value of about 10 nm.

A carbon protection film several nanometers in thickness is formed on the element placing surface 5a so that the surface does not wear even if it contacts fast and slightly to the magnetic disk 10, and corrosion of the magnetic recording element 2 and the magnetic reproduction element 3 is prevented.

There are two types of recording methods of the magnetic disk 10, that is, in the longitudinal (in-plane) direction and the vertical direction relative to a magnetization direction on the magnetic disk 10. Although the magnetic recording element 2, magnetic reproduction element 3, and magnetic disk 10 have different structures depending on the methods, the advantage of the invention can be obtained similarly in either method. In the vertical recording method which records a magnetization signal in a direction perpendicular to a medium, since it is necessary that an external magnetic-field does not enter a main magnetic pole, if a heat radiation member 20 is formed from a magnetic material such as NiFe alloy, it can be used as an external magnetic-field shield for a vertical recording head.

The thin-film head part 1b has an inductive-type magnetic recording element 2 for recording magnetic data by generating a magnetic field between magnetic poles with electric current flowing through the coil, and the magnetic reproduction element 3 for measuring change of a resistance value by a magnetic field. In other words, the thin-film head part 1b comprises metal films 20, 24, an insulating member 25, a resin film 26, and a coil conductor 27 formed on the slider substrate part 1a using a thin-film process such as plating, sputter and polishing. The insulating member 25 is formed from a material such as alumina. Regarding the magnetic recording element 2 and the magnetic reproduction element 3, the periphery of them is embedded within the insulating member 25 except for exposed portions at a flying surface side. The magnetic reproduction element 3 is arranged parallel at a side of the slider substrate part of the magnetic recording element 2. In other words, the magnetic reproduction element 3 and the magnetic recording element 2 are disposed in this order in an air flow direction.

Figure 5:
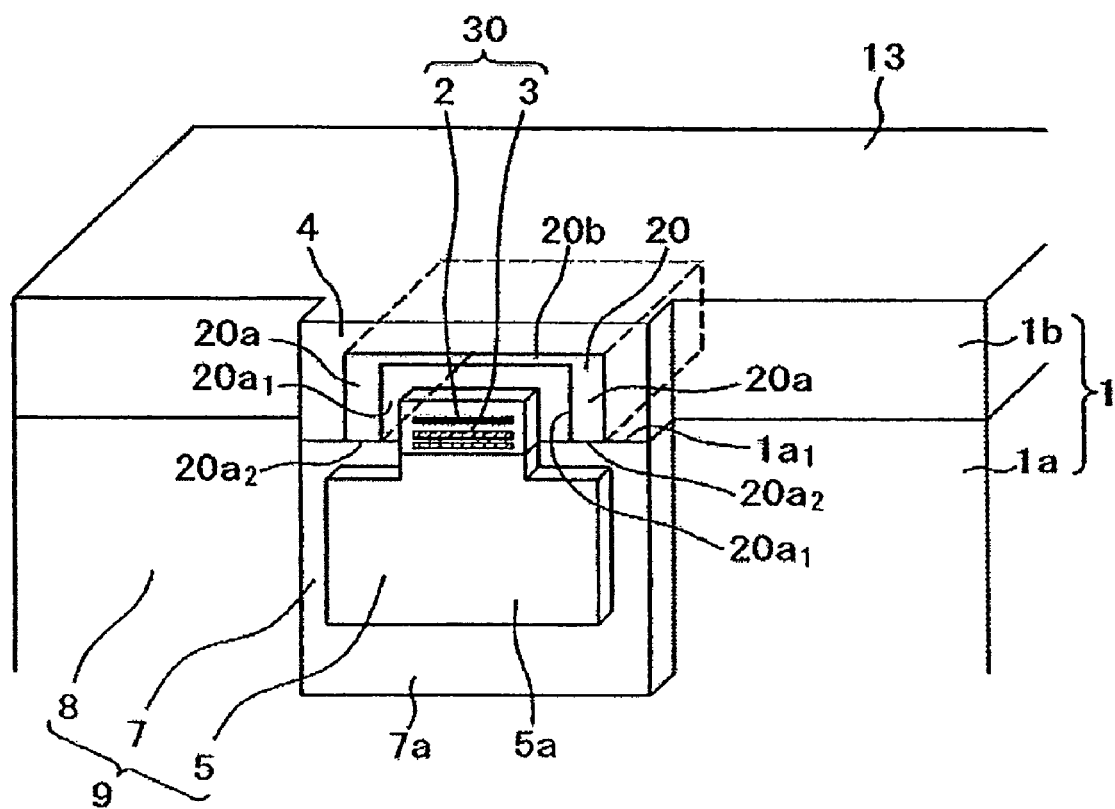
FIG. 5 is a partial perspective view showing a modification of the slider in the first embodiment.

Next, a specific configuration of the heat radiation member 20 is described with reference to FIG. 3 to FIG. 5. FIG. 5 is a partial perspective view showing a modification of the slider 1 in the first embodiment.

The heat radiation member 20 has a function of radiating heat generated by the magnetic recording element 2 from at least lateral regions of the magnetic recording element 2 to the slider substrate part 1a. Accordingly, a heat radiation level can be remarkably increased compared with the case of the related art where heat is radiated from the thermal diffusion member (heat radiation member) through the surface of the protective layer (insulating member), and the local, thermal projection due to thermal expansion of the neighborhood of the magnetic recording element by heating it during recording can be suppressed. Therefore, the flying height margin of the magnetic recording element part can be reduced in recording, whereby improvement in recording density and increase in capacity or decrease in size of the unit can be realized. Since the slider substrate part 1a has a large volume and a surface area compared with the insulating member 4, and has a large surface area close to the magnetic disk 10, heat radiated to the slider substrate part 1a is not stored within the slider substrate part 1a, and the heat is largely radiated into the magnetic disk 10 and the remained heat is radiated to air by heat transfer.

Specifically, the slider substrate part 1a and the heat radiation member 20 are formed from a metal film having a higher heat conductivity than that of the insulating member 4. The heat radiation member 20 can be formed from a material, which has a higher heat conductivity than that of the insulating member 4 that is formed on the slider substrate part 1a and comprises the material such as alumina, for example, a material (including element metal, alloy or compound) selected from a group comprising metals such as Au, Cu or NiFe, or ceramics such as $Al_2O_3$, TiC or SiC.

The heat radiation member 20 is configured to have faces $20a_1$ for sandwiching at least the magnetic recording element 2 and the magnetic reproduction element 3 from both sides. Although the magnetic reproduction element 3 is heated by the heat generated by the magnetic recording element 2, whereby the magnetic reproduction element 3 as a whole expands and large thermal-projection tends to occur locally therein, according to such a configuration, heat generated from both sides of the magnetic recording element 2 and the magnetic reproduction element 3 can be radiated to the slider substrate part 1a, and further in this regard, the flying height margin of the magnetic recording element part can be reduced during recording, whereby improvement in recording density and increase in capacity or decrease in size of the unit can be realized.

The heat radiation member 20 is formed from two edges 20a having surfaces $20a_1$ opposed to both sides of the magnetic recording element 2 and the magnetic reproduction element 3, and one edge 20b having a face $20b_1$ opposed to a side opposite to a slider substrate part side of the magnetic recording element 2. Accordingly, heat generated from the side opposite to the slider substrate part side of the magnetic recording element 2 can be also radiated to the slider substrate part 1a via the one edge 20b and two edges 20a of the heat radiation member 20, and further in this regard, the flying height margin of the magnetic recording element part can be reduced during recording, whereby improvement in recording density and increase in capacity or decrease in size of the unit can be realized.

Here, each thickness of the two edges 20a opposed to both sides of the magnetic recording element 2 and the magnetic reproduction element 3 are formed larger than that of the one edge 20b opposed to the side opposite to the slider substrate part side of the magnetic recording element 2. Accordingly, thermal resistance of the two edges 20a is reduced, whereby a heat radiation level can be increased.

The heat radiation member 20 has a flat face part $20a_2$ which is opposed to a top face $1a_1$ of the slider substrate part 1a and thermally coupled to the top face. Accordingly, the heat radiation area from the flat face part $20a_2$ of the heat radiation member 20 to the top face $1a_1$ of the slider substrate part 1a can be secured. The area of the flat face part $20a_2$ is preferably about 20 $\mu m^2$ or more.

It was found from analysis that a heat radiation effect increases with a decrease in distance from the flat face part $20a_2$ of the heat radiation member 20 to the top face $1a_1$ of the slider substrate part 1a, and when the distance from the flat face part $20a_2$ of the heat radiation member 20 to the top face $1a_1$ of the slider substrate part 1a is about 20 $\mu m$ or less, the heat radiation effect is high.

As shown in FIG. 5, when the flat face part $20a_2$ of the heat radiation member 20 is contacted with the top face $1a_1$ of the slider substrate part 1a, the heat radiation effect is remarkably increased. In a manufacturing method in the case that the flat face part $20a_2$ of the heat radiation member 20 is contacted with the top face $1a_1$ of the slider substrate part 1a, first a base insulating film comprising a material such as alumina is formed on the slider substrate part 1a, then the base insulating film is trenched until the slider substrate part 1a is exposed using a process such as ion milling or etching, and then the heat radiation member 20 is formed in the trenched area, whereby the flat face part $20a_2$ of the heat radiation member 20 can be contacted with the top face $1a_1$ of the slider substrate part 1a as shown in FIG. 5. Alternatively, the heat radiation member 20 is formed before the base insulating film comprising the material such as alumina is formed on the top face $1a$ of the slider substrate part 1a, then the base insulating film is formed on an area other than the heat radiation member 20 on the slider substrate part 1a, whereby the flat face part $20a_2$ of the heat radiation member 20 can be also contacted with the top face $1a_1$ of the slider substrate part 1a as in FIG. 5.

The heat radiation member 20 is formed using a thin-film process such that it is located with being exposed in a plane of the thin-film head part in the component 7a at the air outflow end side of the shallow trench surface 7. Instead of providing the heat radiation member 20 with being exposed in the shallow trench surface 7, from a viewpoint of preventing metal corrosion of the heat radiation member 20, the heat radiation member 20 may be provided inwardly away from a surface of the shallow trench face 7 by a predetermined distance (with being embedded).

An air bearing surface forming the flying surface 9 of the slider 1 comprises the element placing surface 5a as a first surface which approaches the magnetic disk 10 most closely during recording, and is provided with the magnetic recording element 2 and the magnetic reproduction element 3, and the shallow trench surface 7a and the deep trench surface 8 which are two or more surfaces having predetermined, different depths from the element placing surface (first surface) 5a; and is configured such that a position of the heat radiation member 20 projected on the air bearing surface is in the shallow trench surface 7a and the deep trench surface 8 which are surfaces having a depth other than that of the element placing surface (first surface) 5a. Accordingly, even if the heat radiation member 20 expands when ambient temperature rises, the flying height of the slider 1 is not affected. In other words, if a configuration is made such that the position of the heat radiation member 20 projected on the air bearing surface is in the first surface, there is concern that the first surface is locally projected by expansion of the heat radiation member 20 when the ambient temperature rises, which affects on the flying height of the slider 1, causing an increase in the flying height margin.

Figure 6:
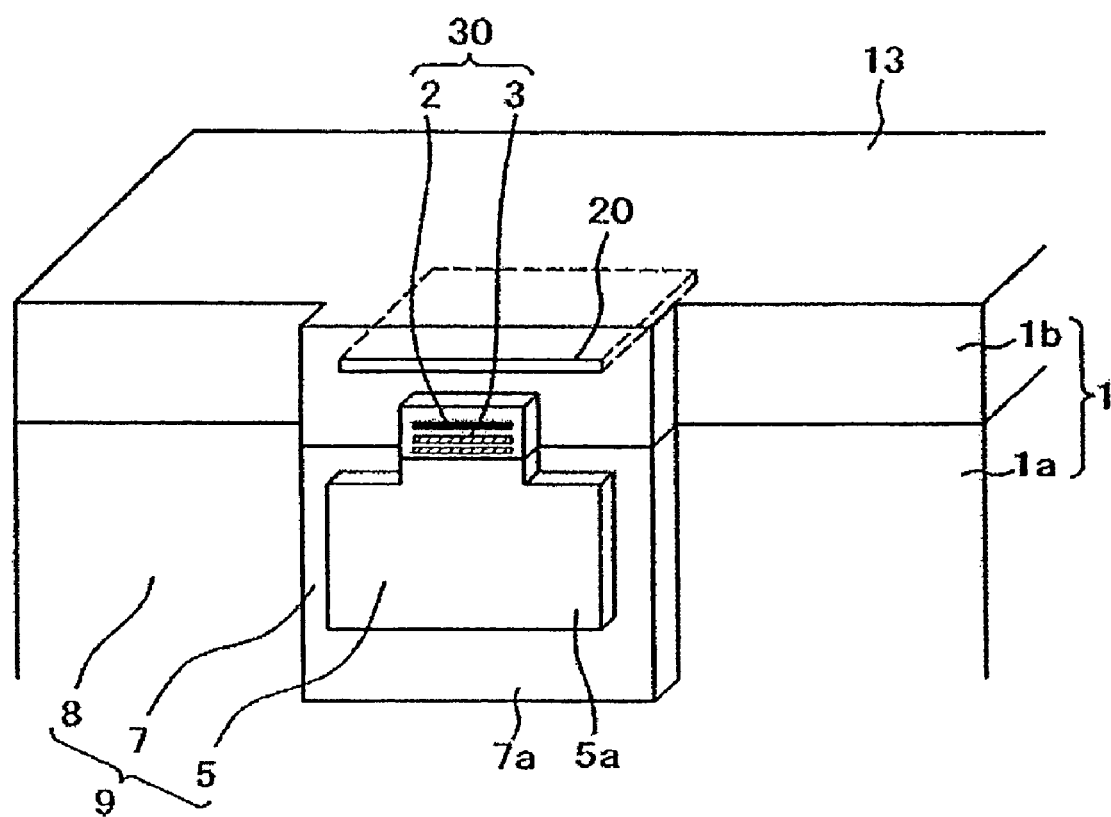
FIG. 6 is a partial perspective view of a slider of a comparative example.
Figure 7:
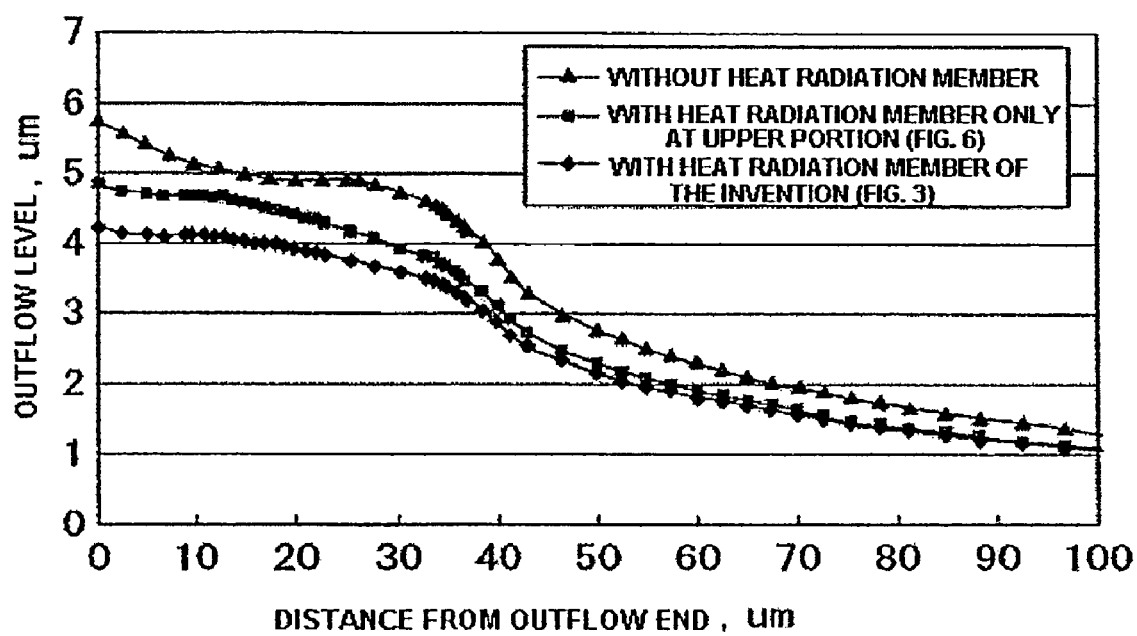
FIG. 7 is a characteristic diagram showing a thermal projection level due to heat generated by the magnetic recording element, comparing presence or absence and arranging configurations of the heat radiation member.

Next, effectiveness of the heat radiation member 20 on the thermal projection level is described with reference to FIG. 6 and FIG. 7. FIG. 6 is a partial perspective view of a slider 1 of a comparative example against the slider 1 of the first embodiment. In the slider 1 of the comparative example, a flat-plate heat radiation member 20 is placed at a side opposite to a slider substrate part side of a magnetic recording element 2. FIG. 7 is a characteristic diagram showing a thermal projection level due to heat generated by the magnetic recording element 2, comparing presence or absence and arranging configurations of the heat radiation member 20. The thermal projection level was calculated using head heat transfer analysis and head deformation analysis due to heat generated by the magnetic recording element 2.

As clearly shown in FIG. 7, it is confirmed that when the slider 1 of the comparative example is used, the thermal projection level can be reduced compared with a slider 1 without the heat radiation member 20, however, a reduction effect is not sufficient only by this, and the reduction effect on the thermal projection level is larger in the case that the slider 1 of the first embodiment is used.

Second Embodiment

Figure 8:
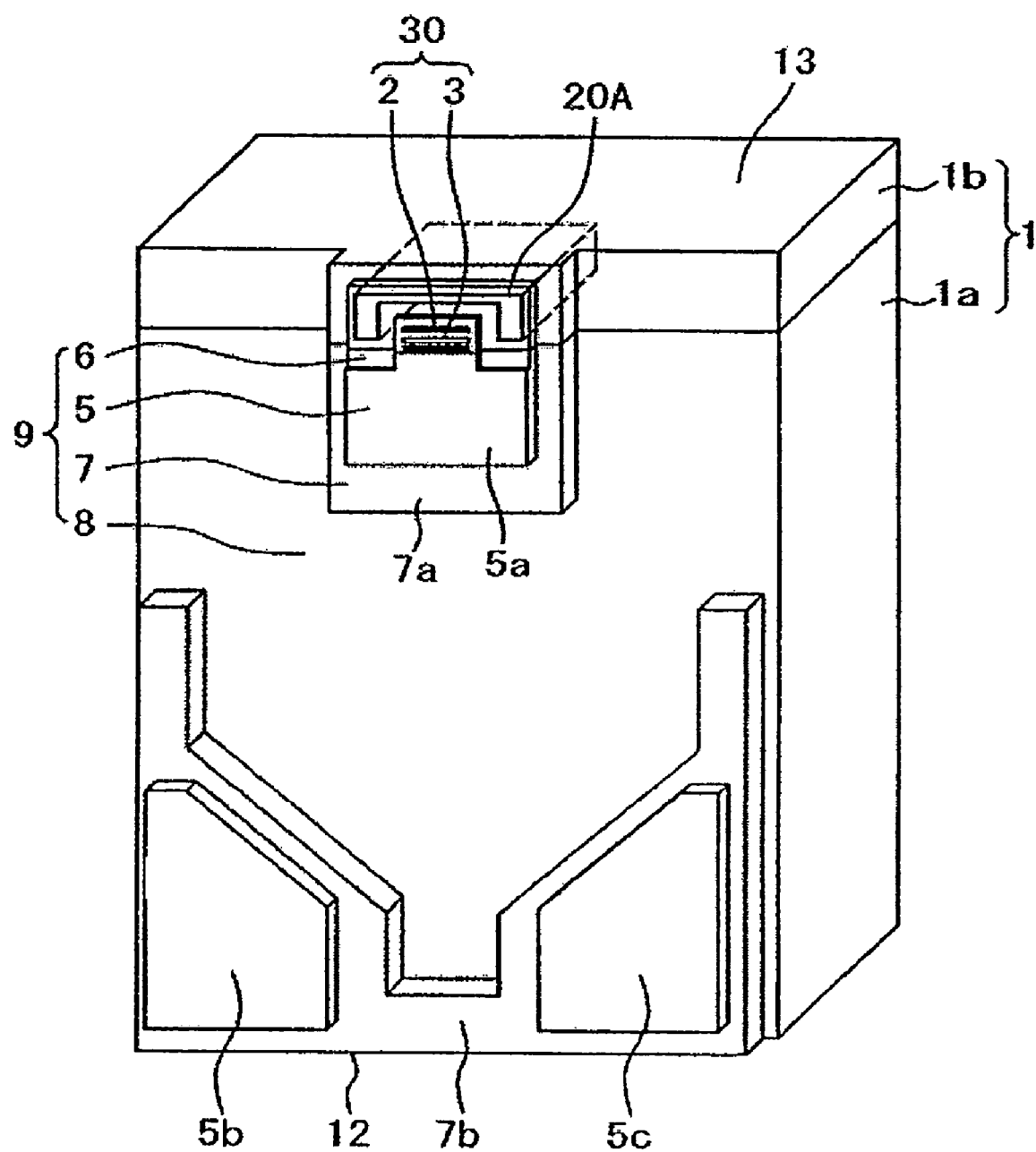
FIG. 8 is a perspective view of a slider for use in a magnetic disk unit of a second embodiment of the invention.
Figure 9:
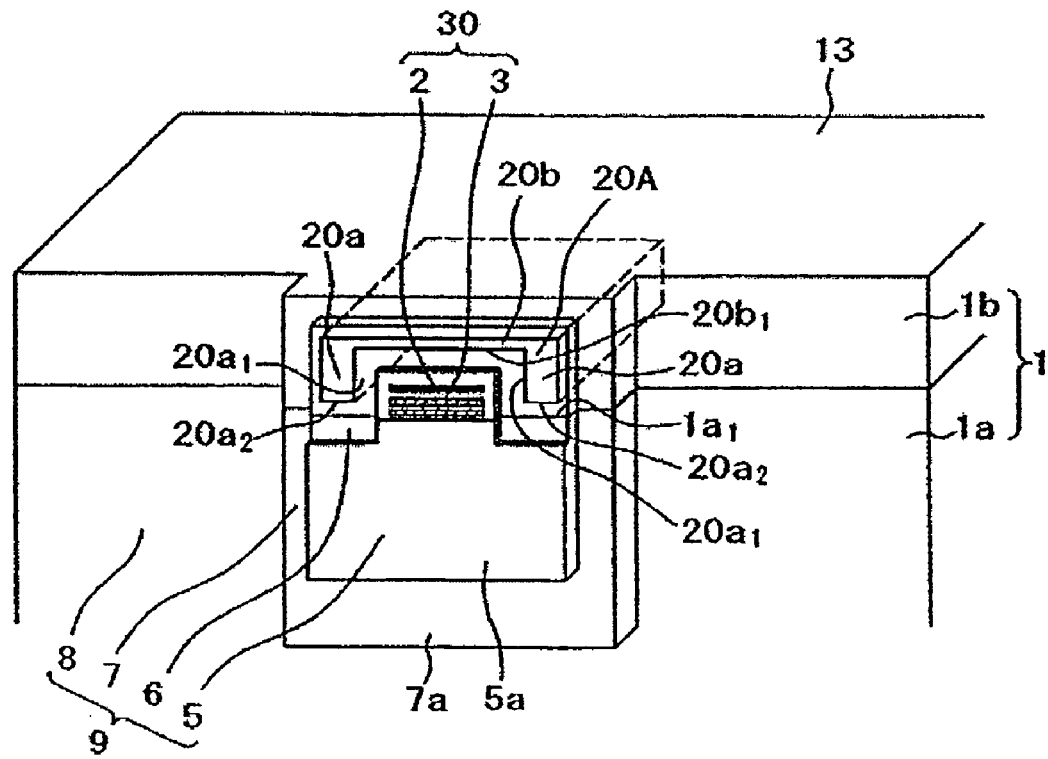
FIG. 9 is a partial perspective view of the slider of FIG. 8.
Figure 10:
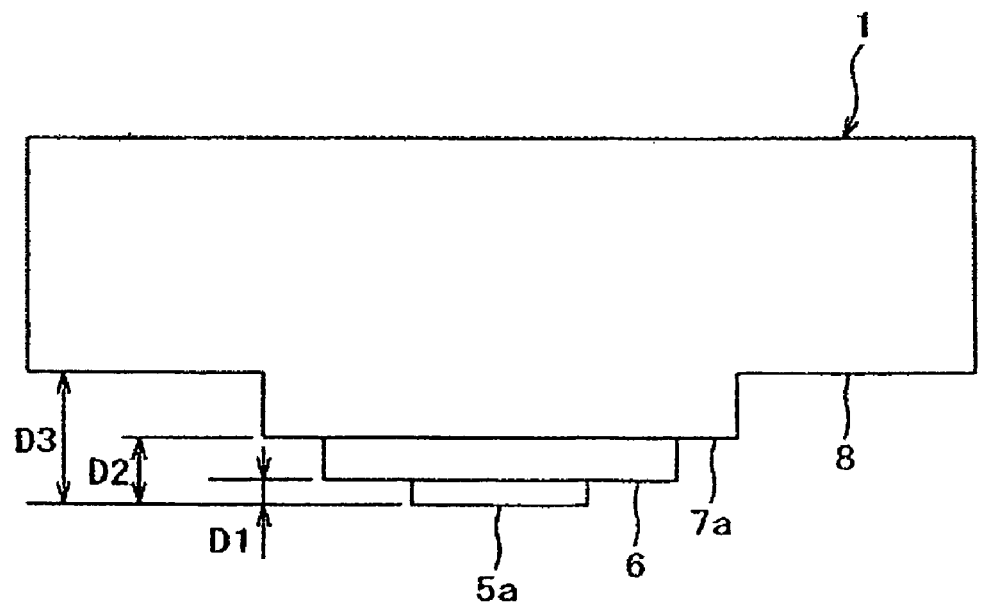
FIG. 10 is a view of the slider of FIG. 9, which is shown from an outflow end side.
Figure 11:
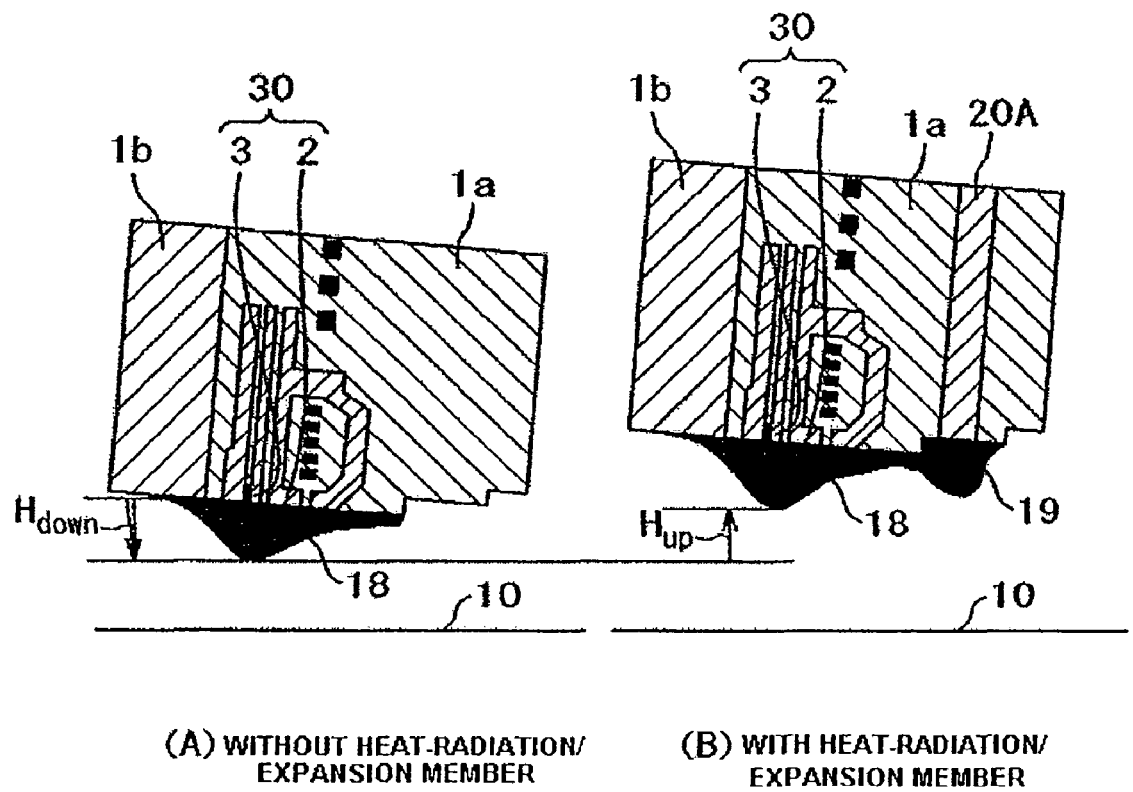

Next, a second embodiment of the invention is described using FIG. 8 to FIG. 11. FIG. 8 is a perspective view of a slider 1 for use in a magnetic disk unit 11 of the second embodiment of the invention; FIG. 9 is a partial perspective view of the slider 1 of FIG. 8; FIG. 10 is a view of the slider 1 of FIG. 9, which is shown from an outflow end side; and FIG. 11 is a view illustrating a mechanism of correcting lowering of flying height due to ambient-temperature rise in the second embodiment. The second embodiment is different from the first embodiment in the following points, and essentially same as the first embodiment in other points, therefore overlapped description is omitted.

The slider 1 of the second embodiment is called three-stage step slider, and a flying surface 9 of the three-stage step slider comprises four types of surfaces substantially parallel to each together. Specifically, an air bearing surface forming the flying surface 9 comprises an element placing surface 5a as a first surface which approaches a magnetic disk 10 most closely during recording, and is provided with a magnetic recording element 2 and a magnetic reproduction element 3; a super-shallow trench surface 6 as a second surface having a depth of about 5 nm to 50 nm from the element placing surface (first surface) 5a; a shallow trench surface 7 as a third surface having a predetermined depth from the super-shallow trench surface (second surface) 6; and a deep trench surface 8 as a fourth surface located further deeper than the shallow trench surface (third surface) 7. In other words, the super-shallow trench surface 6 is formed between the element placing surface 5a and the shallow trench surface 7a in the air bearing surface in the first embodiment, and the super-shallow trench surface 6 is placed with being located around a small width portion of the element placing surface 5a.

In the second embodiment, the surfaces are four types of surfaces of an element placing surface 5 that is located most closely to the magnetic disk 1, a super-shallow trench surface 6 about 5 nm deeper than the element placing surface, a shallow trench surface 7 as a step bearing surface about 150 nm deeper than the element placing surface, and a deep trench surface 8 about 1 μm deeper than the element placing surface. In other words, in FIG. 10, the depth of the super-shallow trench surface from the element placing surface D1, the depth of the shallow trench surface from the element placing surface D2, and the depth of the deep trench surface from the element placing surface D3 are about 5 nm, about 150 nm, and 1 μm respectively. Here, as an easy method of forming a step of about 5 nm between the element placing surface 5 and the super-shallow trench surface 6, a method that the step is obtained by removing a carbon film of about 5 nm with means such as oxygen ashing is used.

In the three-stage step slider 1, the element placing surface 5a is made to be small and narrow in width, and the super-shallow trench surface 6 slightly lower than the element placing surface 5a is provided around the surface 5a, whereby it can be ensured that the element placing surface 5a approaches the magnetic disk 1 most closely without regard to inclination in a roll direction of the slider 1, which contributes to the decrease in flying height of the magnetic recording element 2 and the magnetic reproduction element 3. Moreover, the slider has a feature that even if the element placing surface 5a is small, since the super-shallow trench surface 6 generates air pressure and thus supports load, tracking performance to small swell of the magnetic disk 10 is not degraded.

In the second embodiment, a heat-radiation/expansion member 20A combines a function as a heat radiation member for radiating heat generated by the magnetic recording/reproduction element 30 from lateral regions and a side opposite to a slider substrate part side of the magnetic recording/reproduction element 30 to a slider substrate part 1a with a function as an expansion member for correcting flying height by locally projecting a flying surface with ambient-temperature rise. In other words, the heat-radiation/expansion member 20A has a larger linear expansion coefficient than that of an insulating member 4, and is provided such that a position of the heat-radiation/expansion member 20A projected on an air bearing surface is in the super-shallow trench surface (second surface) 6 near the magnetic recording/reproduction element 30. Accordingly, when the ambient temperature rises, the super-shallow trench surface 6 is displaced to a magnetic disk 1 side, and air pressure generated on the super-shallow trench surface 6 increases. By the increase in air pressure, the flying height of the slider 1 as a whole increases to correct the flying height.

A correction principle of flying height is described using FIG. 11. When the ambient temperature rises, thermal projection 18 occurs on the element placing surface 5a because of the difference in linear expansion coefficients between a metal material or a resin material of a magnetic shield near the magnetic recording/reproduction element 30 and a magnetic pole, and a ceramic insulating material of other portions. In the case that the heat-radiation/expansion member 20A is not present, although an increase in flying height due to the thermal projection 18 occurs, a decrease in flying height $H_{down}$ of the magnetic recording/reproduction element 30 part is caused due to the ambient-temperature rise as shown in FIG. 11(A), which has been one of reasons for the fact that the flying height margin cannot be reduced. On the contrary, in the case that the heat-radiation/expansion member 20A of the second embodiment is present, when the ambient temperature rises, thermal projection 19 occurs in the super-shallow trench surface 6 due to expansion of the heat-radiation/expansion member 20A as shown in FIG. 11(B). By the thermal projection 19, the slider 1 flies with flying height increased only by $H_{up}$, whereby the flying height can be corrected, and the flying height margin can be reduced. Regarding an effect of the heat-radiation/expansion member 20A on the prevention of the thermal projection due to the heat by the magnetic recoding element 2, since it is same as in the first embodiment, overlapped description is omitted.

According to the second embodiment, the flying height margin of the magnetic recording element part is reduced in both periods of recording and ambient-temperature rise, whereby improvement in recording density and increase in capacity and decrease in size of the unit can be realized.

Figure 12:
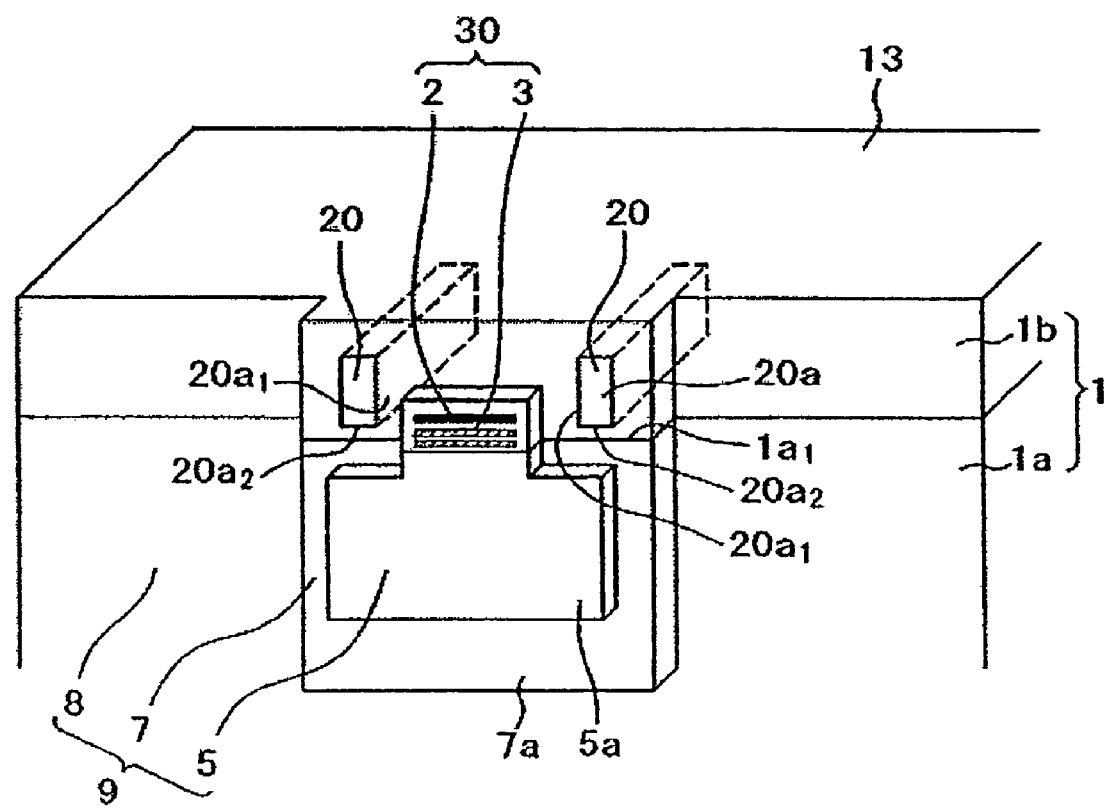
FIG. 12 is an enlarged view of an outflow end of a slider of a third embodiment.

Next, a third embodiment of the invention is described using FIG. 12. FIG. 12 is a partial perspective view of a slider 1 for use in the magnetic disk unit 11 of the third embodiment of the invention. The third embodiment is different from the first embodiment in the following points, and essentially same as the first embodiment in other points, therefore overlapped description is omitted.

In the third embodiment, a heat radiation member 20 is shaped to enclose only lateral portions in a longitudinal direction of a magnetic recording element 2 and a magnetic reproduction element 3. Even in such a shape, since a heat radiation channel of heat generated during recording to a slider substrate part 1a is formed, an effect of radiating the heat generated during recording is given, and the heat radiation member 20 can be easily produced.

Figure 13:
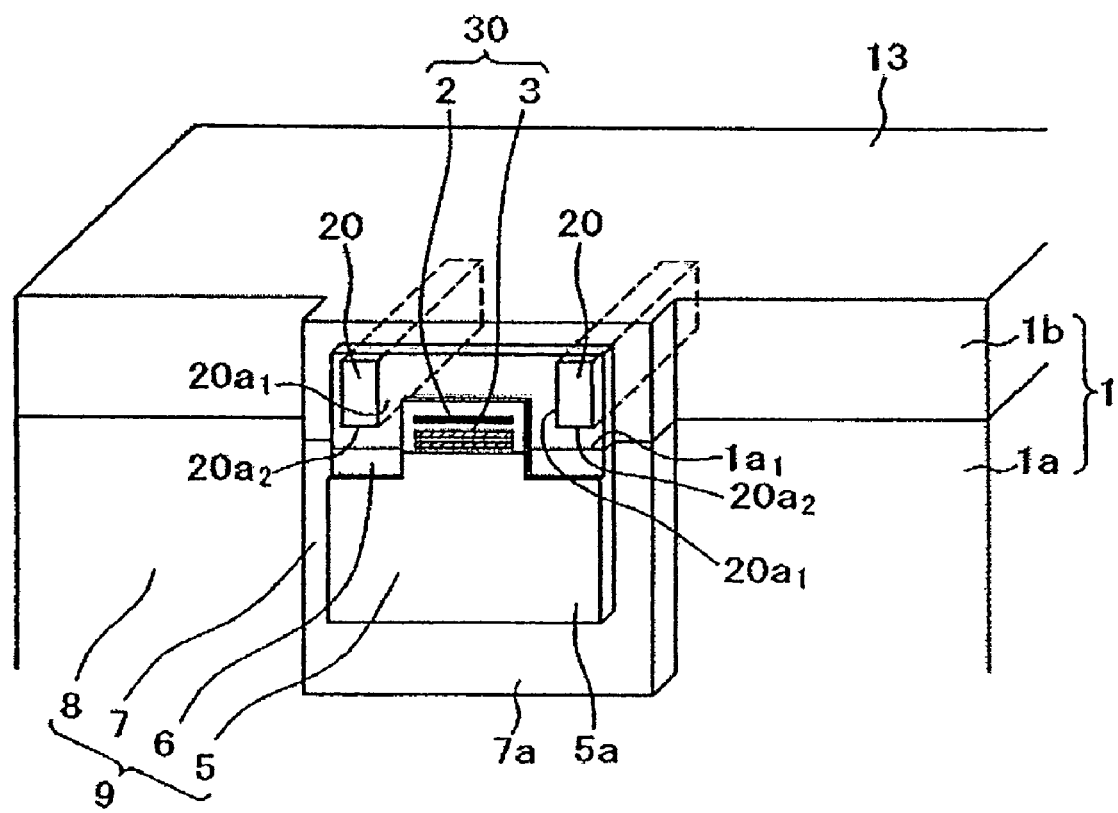
FIG. 13 is an enlarged view of an outflow end of a slider of a fourth embodiment.

Next, a fourth embodiment of the invention is described using FIG. 13. FIG. 13 is a partial perspective view of a slider 1 for use in the magnetic disk unit 11 of the fourth embodiment of the invention. The fourth embodiment is different from the second embodiment in the following points, and essentially same as the second embodiment in other points, therefore overlapped description is omitted.

In the fourth embodiment, a heat radiation member 20 is shaped to enclose only lateral portions in a longitudinal direction of a magnetic recording element 2 and a magnetic reproduction element 3. Even in such a shape, since a heat radiation channel of heat generated during recording to a slider substrate part 1a is formed, an effect of radiating the heat generated during recording is given, and an effect of correcting height by thermal projection in ambient-temperature rise is given, in addition, the heat radiation member 20 can be easily produced.

Moreover, if the radiation member 20 is formed on the super-shallow trench surface 6 as in FIG. 12, thermal projection of an element part in ambient-temperature rise can be corrected, therefore similar effects as in the second embodiment can be obtained.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk unit comprising:
a magnetic disk arranged in a freely rotational manner; and
a magnetic head slider disposed to face a surface of the magnetic disk, and having a magnetic recording element provided thereon to record data into the magnetic disk;
wherein air flow between the magnetic disk and the magnetic head slider is generated to fly the magnetic head slider above the magnetic disk;
wherein the magnetic head slider has a slider substrate part and a thin-film head part formed on the slider substrate part using a thin-film process,
wherein the thin-film head part comprises an insulating member, the magnetic recording element provided in the insulating member, and a heat radiation member for radiating heat generated by the magnetic recording element from lateral regions of the magnetic recording element to the slider substrate part, and
wherein the heat radiation member is formed from two edges opposed to both sides of the magnetic recording element, and one edge opposed to a side opposite to the side of the slider substrate part of the magnetic recording element, the three edges form a U shape having an opening facing towards the direction of an air inflow end face.

2. The magnetic disk unit according to claim 1, wherein the slider substrate part and the heat radiation member are formed from a material having a higher heat conductivity than a material of the insulating member.

3. The magnetic disk unit according to claim 2, wherein the slider substrate part is formed from a mixed sintered-body of alumina and titanium carbide, the insulating member is formed from alumina, and the heat radiation member is formed from a metal material having a higher heat conductivity than a heat conductivity of the insulating member.

4. The magnetic disk unit according to claim 1, wherein the thin-film head part has a magnetic reproduction element arranged parallel at a side of the slider substrate part of the magnetic recording element, and the heat radiation member is formed to have surfaces for sandwiching the magnetic recording element and the magnetic reproduction element from both sides.

5. The magnetic disk unit according to claim 1, wherein each thickness of the two edges opposed to both the sides of the magnetic recording element and the magnetic reproduction element is formed larger than a thickness of the one edge opposed to the side opposite to the side of the slider substrate part of the magnetic recording element.

6. The magnetic disk unit according to claim 1, wherein the heat radiation member has a flat-face part which is opposed to a surface of the slider substrate part and thermally coupled to the surface.

7. The magnetic disk unit according to claim 6, wherein the flat-face part which is opposed to the surface of the slider substrate part and thermally coupled to the surface has an area of about 20 $\mu m^2$ or more.

8. The magnetic disk unit according to claim 6, wherein the flat-face part which is thermally coupled to the surface of the slider substrate part is contacted directly with the surface of the slider substrate part.

9. The magnetic disk unit according to claim 6, wherein the flat-face part which is thermally coupled to the surface of the slider substrate part has a distance of about 20 $\mu m$ or less to the surface of the slider substrate part.

10. The magnetic disk unit according to claim 1, wherein an air bearing surface forming a flying surface of the magnetic head slider comprises a first surface which approaches the magnetic disk most closely during recording and has been provided with the magnetic recording element, and two or more surfaces having predetermined, different depths from the first surface; and the heat radiation member has a position projected on the air bearing surface which is in a surface having a depth other than the depth of the first surface.

11. The magnetic disk unit according to claim 10, wherein the first surface is provided at a position of a laterally central portion; and the heat radiation member is formed from two edges opposed to both sides of the magnetic recording element and one edge opposed to a side opposite to a side of the slider substrate part of the magnetic recording element, and has a position projected on the air bearing surface which is formed in a shape of fringing the first surface.

12. A magnetic disk unit comprising:
a magnetic disk arranged in a freely rotational manner; and
a magnetic head slider disposed to face a surface of the magnetic disk, and having a magnetic recording element provided thereon to record data into the magnetic disk;
wherein air flow between the magnetic disk and the magnetic head slider is generated to fly the magnetic head slider above the magnetic disk;
wherein the magnetic head slider has a slider substrate part and a thin-film head part formed on the slider substrate part using a thin-film process,
wherein the thin-film head part comprises an insulating member, the magnetic recording element provided in the insulating member, and a heat radiation member for radiating heat generated by the magnetic recording element from lateral regions of the magnetic recording element to the slider substrate part, and
wherein an air bearing surface forming a flying surface of the magnetic head slider comprises a first surface which approaches the magnetic disk most closely during recording and has been provided with the magnetic recording element, a second surface having a depth of about 5 nm to 50 nm from the first surface, a third surface having a predetermined depth from the second surface, and a fourth surface located further deeper than the third surface; and the heat radiation member has a position projected on the air bearing surface which is in the second surface.

13. The magnetic disk unit according to claim 12, wherein the heat radiation member is formed from a material having a larger linear expansion coefficient than a linear expansion coefficient of the insulating member.

14. The magnetic disk unit according to claim 12, wherein the first surface is provided at a position of a laterally central portion; and the heat radiation member is formed from two edges opposed to both sides of the magnetic recording element and one edge opposed to a side opposite to a side of the slider substrate part of the magnetic recording element, and has a position projected on the air bearing surface which is formed in a shape of fringing the first surface.

15. A magnetic head slider comprising:
a slider substrate part and a thin-film head part formed on the slider substrate part using a thin-film process; and
a flying surface that generates air flow between a magnetic disk and the surface for flying, and a magnetic recording element for recording data into the magnetic disk;
wherein the thin-film head part comprises an insulating member, the magnetic recording element provided in the insulating member, and a heat radiation member for radiating heat generated by the magnetic recording element from lateral regions of the magnetic recording element to the slider substrate part, and
wherein the heat radiation member is formed from two edges opposed to both sides of the magnetic recording element, and one edge opposed to a side opposite to the side of the slider substrate part of the magnetic recording element, the three edges form a U shape having an opening facing towards the direction of an air inflow end face.

16. The magnetic head slider according to claim 15, wherein the thin-film head part has a magnetic reproduction element arranged parallel at a side of the slider substrate part of the magnetic recording element, and the heat radiation member is formed to have surfaces for sandwiching the magnetic recording element and the magnetic reproduction element from both sides.

17. A magnetic disk unit comprising:
a magnetic disk arranged in a freely rotational manner; and
a magnetic head slider disposed to face a surface of the magnetic disk, and having a magnetic recording/reproduction element comprising a magnetic recording element and a magnetic reproduction element for recording data into the magnetic disk and reproducing data from the magnetic disk;
wherein air flow is generated between the magnetic disk and the magnetic head slider to fly the magnetic head slider above the magnetic disk,
wherein the magnetic head slider has a slider substrate part and a thin-film head part formed on the slider substrate part using a thin-film process,
wherein the thin-film head part comprises an insulating member, the magnetic recording/reproduction element provided in the insulating member, and an expansion member having a higher linear expansion coefficient than a linear expansion coefficient of the insulating member near the magnetic recording/reproduction element,
wherein an air bearing surface forming a flying surface of the magnetic head slider comprises a first surface which approaches the magnetic disk most closely during recording and is provided with the magnetic recording element and has a smaller width than that of a second surface, the second surface having a depth of about 5 nm to 50 nm from the first surface, a third surface having a predetermined depth from the second surface, and a fourth surface located further deeper than the third surface, and
wherein the expansion member is provided such that a position projected on the air bearing surface is in the second surface, and the second surface is locally projected with ambient-temperature rise to correct flying height.

18. The magnetic disk unit according to claim 17, wherein the thin-film head part has a magnetic reproduction element arranged parallel at a side of the slider substrate part of the magnetic recording element, and the heat radiation member is formed to have surfaces for sandwiching the magnetic recording element and the magnetic reproduction element from both sides.

19. A magnetic head slider comprising:
a slider substrate part and a thin-film head part formed on the slider substrate part using a thin-film process; and
a flying surface that generates air flow between the magnetic disk and the surface for flying, and a magnetic recording element for recording data into the magnetic disk and a magnetic reproduction element for reproducing data from the magnetic disk;
wherein the thin-film head part comprises an insulating member, the magnetic recording element or the magnetic reproduction element provided in the insulating member, and an expansion member, which has a higher linear expansion coefficient than a linear expansion coefficient of the insulating member, near the magnetic recording element or the magnetic reproduction element,
wherein an air bearing surface forming a flying surface of the magnetic head slider comprises a first surface which approaches the magnetic disk most closely during recording and is provided with the magnetic recording element and has a smaller width than that of a second surface, the second surface having a depth of about 5 nm to 50 nm from the first surface, a third surface having a predetermined depth from the second surface, and a fourth surface located further deeper than the third surface, and
wherein the expansion member is provided such that a position projected on the air bearing surface is in the second surface, and the second surface is locally projected with ambient-temperature rise to correct flying height.

* * * * *